US008615671B2

(12) United States Patent
Robles et al.

(10) Patent No.: US 8,615,671 B2
(45) Date of Patent: Dec. 24, 2013

(54) TECHNIQUES FOR MANAGING LOWER POWER STATES FOR DATA LINKS

(75) Inventors: Raymond C Robles, Gilbert, AZ (US); Carolyn D Foster, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 738 days.

(21) Appl. No.: 12/576,999

(22) Filed: Oct. 9, 2009

(65) Prior Publication Data

US 2011/0087913 A1   Apr. 14, 2011

(51) Int. Cl.
*G06F 1/00* (2006.01)
(52) U.S. Cl.
USPC ............................ 713/323; 710/260; 710/302
(58) Field of Classification Search
USPC ......................... 710/301–302, 260; 713/323
See application file for complete search history.

(56) References Cited

U.S. PATENT DOCUMENTS

| 5,862,393 | A | * | 1/1999 | Davis ............................. | 713/300 |
|---|---|---|---|---|---|
| 7,565,457 | B2 | | 7/2009 | Ooi et al. | |
| 7,565,473 | B2 | * | 7/2009 | Tabira et al. .................. | 710/302 |
| 2007/0156942 | A1 | * | 7/2007 | Gough ........................... | 710/302 |
| 2008/0001480 | A1 | * | 1/2008 | Ooi et al. ........................ | 307/85 |
| 2008/0049716 | A1 | | 2/2008 | Munguia et al. | |
| 2009/0019301 | A1 | * | 1/2009 | Minami ........................ | 713/324 |
| 2009/0083587 | A1 | * | 3/2009 | Ng et al. ........................ | 714/47 |
| 2010/0079444 | A1 | * | 4/2010 | Kyriazis et al. ............... | 345/418 |
| 2011/0320706 | A1 | * | 12/2011 | Nakajima ..................... | 711/114 |

* cited by examiner

*Primary Examiner* — Nimesh G Patel
(74) *Attorney, Agent, or Firm* — Kacvinsky Daisak PLLC

(57) ABSTRACT

Techniques for managing lower power states for data links are described. An apparatus may comprise a memory unit to store a device connection manager for a controller of a bi-directional serial link connected to a device. The apparatus may comprise a processor operative to execute the device connection manager, the device connection manager operative to read a register of the controller storing information indicating an interface of the controller for the bi-directional serial link is operating in a lower power management state, send a control directive on a periodic basis for the interface to transition to a temporary active state, and receive an interrupt from the interface indicating the device is disconnected from the bi-directional serial link during a temporary active state. Other embodiments are described and claimed.

20 Claims, 7 Drawing Sheets

TECHNIQUES FOR MANAGING LOWER POWER STATES FOR DATA LINKS

BACKGROUND

Serial Advanced Technology Attachment (SATA) devices are becoming prevalent on many mobile and desktop computers. SATA is a high-speed data link used for communication between input/output (I/O) devices and the host controller(s) that are connected to or embedded within a chipset. There are many benefits to SATA including having a dedicated link per device to increase data throughput, native command queuing (NCQ) that increases performance of SATA hard disks by allowing the individual hard disk to receive more than one I/O request at a time and decide which to complete first, and hot-plugging, which allows removing and replacing components within a computer system, while the system is operating.

The hot-plugging benefit, also called hot-swapping, is very useful for many mobile computer users because the mobile computer's limited size rarely allows it enough drive bays to concurrently run an extra hard disk drive, a CD-ROM drive, a DVD drive, or any other number of hardware peripherals. Thus, hot-plugging between two or more of these devices is very beneficial to a mobile computer user to allow work to continue without requiring a reboot.

Additionally, as computers become more powerful and more portable, the need for power savings increases to allow longer battery life, decrease total system weight, and decrease the necessary expensive thermal solution requirements among other benefits. Although SATA devices do allow hot-swapping, the current SATA Advanced Host Controller Interface (AHCI) definition requires that hot-swap capabilities and SATA power management be mutually exclusive.

DETAILED DESCRIPTION

Figure 1:
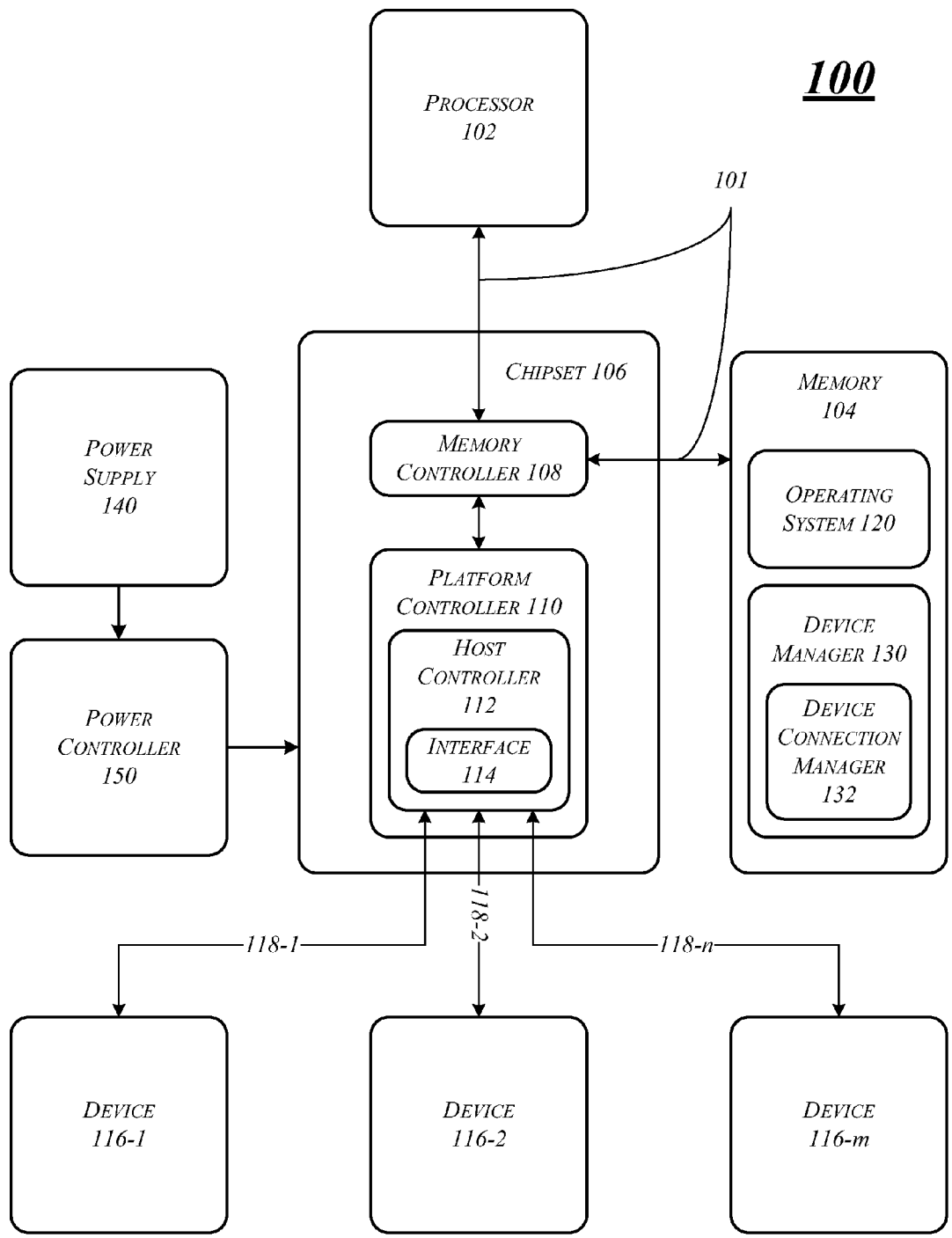
FIG. 1 illustrates one embodiment of a device management system.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Embodiments are generally directed to enhanced power management and device connectivity management for high-speed bi-directional data interconnects, buses or links. Some embodiments are particularly directed to enhanced power management and device connectivity management for a computing device implementing one or more interconnect protocols or serial advanced technology attachment (SATA) techniques, such as those defined by the Serial ATA International Organization (SATA-IO) including specifications titled "High Speed Serialized AT Attachment," Revision 3.0, June 2009 ("SATA Specification"); and the SATA advanced host controller interface (AHCI), Revision 1.3, June 2008 ("AHCI Specification"); as well as their progeny, revisions and variants. The embodiments, however, are not limited to SATA techniques, and are applicable to any interconnect protocols implementing simultaneous power management and device connectivity management techniques.

SATA devices provide various capabilities, including hot-swapping and link power management techniques. Although SATA devices do allow hot-swapping, however, the current SATA AHCI Specification creates a conflict where the hot-swap capabilities and SATA power management are mutually exclusive. When a SATA device is hot-plug removed, an interrupt occurs from a host controller to a device driver that causes the device driver to enumerate or re-enumerate all devices for a system. This enumeration operation allows for physical devices that were exported to an operating system to effectively be removed. However, when a serial link is in a lower power management state (e.g., partial or slumber) and a SATA device is hot-plug removed, the SATA host controller and AHCI interface cannot detect the removal and therefore no interrupt is generated. No interrupt means that the removed device will continue to be exported to the operating system as though the removed device were still present, which may potentially have undesirable side effects.

To solve these and other problems, embodiments implement an enhanced device driver for a SATA host controller and AHCI interface that allows simultaneous power management and detection of removed devices. In various embodiments, the enhanced device driver may comprise a software component that employs an algorithm that periodically brings the SATA and/or eSATA external PHY on the AHCI interface of the SATA host controller, and subsequent SATA data links, out of a lower power management state on a periodic basis to allow for interrupts from hot-plug removals to be detected by the SATA host controller and AHCI interface. The enhanced device driver employs a technique in which a software-only timer fires every one second and performs the following actions: (1) brings the SATA data link out of a lower power management state to an active power management state; (2) delays for a defined time interval (e.g., 10 ms); (3) returns the SATA data link to the lower power management state; and (4) resets the timer.

Implementing a software based solution to solve the mutually-exclusive problem of power management and hot-plug removal detection provides several advantages over conventional techniques. For instance, a software algorithm contains no hardware dependencies and provides a way for legacy devices to enable SATA and eSATA hot plug capability and link power management simultaneously. The software algorithm has been fine tuned to allow for negligible power consumption loss. Also, the defined time interval (e.g., 10 ms delay) within the software algorithm allows for any out of band (OOB) signaling to finish before putting the SATA data link back into the lower power management state. This delay also allows for the host controller PHY to receive any traffic from a SATA device for that extra duration. It may be appreciated that other advantages exist as well.

It is worthy to note that various embodiments may utilize a distributed model where different components of a power and device management system are implemented in different devices. As such, operations for certain distributed system components may need to be coordinated. This coordination may involve the exchange of information. The exchange of information may be performed using messages implemented as signals allocated to various signal lines. In such allocations, each message is a signal. However, further embodiments may alternatively employ data messages. Such data messages may be sent across various connections or channels. Exemplary connections or channels include parallel interfaces, serial interfaces, bus interfaces, network interfaces, and so forth.

FIG. 1 illustrates a device management system 100 in accordance with one or more embodiments. In general, the device management system 100 may comprise various physical and/or logical components for communicating information which may be implemented as hardware components (e.g., computing devices, processors, logic devices), executable computer program instructions (e.g., firmware, software) to be executed by various hardware components, or any combination thereof, as desired for a given set of design parameters or performance constraints.

In the illustrated embodiment shown in FIG. 1, the device management system 100 comprises a processor 102, a memory 104, a chipset 106, one or more devices 116-1-*m*, where m represents any positive integer, a power supply 140, and a power controller 150. The memory 104 may store an operating system (OS) 120 and a device manager 130. The device manager 130 may further comprise a device connection manager 132. The chipset 106 may further comprise hubs 108, 110. The platform controller 110 may further comprise a host controller 112 having an interface 114. Although FIG. 1 may show a limited number of elements by way of example, it can be appreciated that a greater or a fewer number of elements may be employed for a given implementation.

In various embodiments, the device management system 100 may be implemented by a computing platform such as a mobile platform, personal computer (PC) platform, and/or consumer electronics (CE) platform supporting various networking, communications, and/or multimedia capabilities. Such capabilities may be supported by various networks, such as a Wide Area Network (WAN), Local Area Network (LAN), Metropolitan Area Network (MAN), wireless WAN (WWAN), wireless LAN (WLAN), wireless MAN (WMAN), wireless personal area network (WPAN), Worldwide Interoperability for Microwave Access (WiMAX) network, broadband wireless access (BWA) network, the Internet, the World Wide Web, telephone network, radio network, television network, cable network, satellite network such as a direct broadcast satellite (DBS) network, Code Division Multiple Access (CDMA) network, third generation (3G) network such as Wide-band CDMA (WCDMA), fourth generation (4G) network, Time Division Multiple Access (TDMA) network, Extended-TDMA (E-TDMA) cellular radiotelephone network, Global System for Mobile Communications (GSM) network, GSM with General Packet Radio Service (GPRS) systems (GSM/GPRS) network, Synchronous Division Multiple Access (SDMA) network, Time Division Synchronous CDMA (TD-SCDMA) network, Orthogonal Frequency Division Multiplexing (OFDM) network, Orthogonal Frequency Division Multiple Access (OFDMA) network, North American Digital Cellular (NADC) cellular radiotelephone network, Narrowband Advanced Mobile Phone Service (NAMPS) network, Universal Mobile Telephone System (UMTS) network, and/or any other wired or wireless network in accordance with the described embodiments.

In some implementations, the device management system 100 may comprise a system within and/or connected to a computing device including without limitation a user equipment (UE), a mobile device, a mobile station, a mobile unit, a personal digital assistant (PDA), a mobile computing device, a smart phone, a cellular telephone, a handset, a one-way pager, a two-way pager, a messaging device, a computer, a personal computer (PC), a desktop computer, a laptop computer, a notebook computer, a netbook computer, a handheld computer, a tablet computer, a thin client, consumer electronics, a gaming device, a video device, a television (TV) device, a digital TV (DTV) device, high-definition TV (HDTV) device, media player device, or other type of computing device in accordance with the described embodiments.

In one embodiment, for example, a computing device such as a mobile computing device may implement the device management system 100. The mobile computing device may include, for example, various components suitable for computing and communications sub-systems typically implemented for a mobile computing device. In one embodiment, the mobile computing device may include an electronic display, such as a liquid crystal display (LCD) such as a touch-sensitive, color, thin-film transistor (TFT) LCD, a plasma display, organic light emitting diode (OLED) displays, a cathode ray tube (CRT) display, or other type of suitable visual interface for displaying content to a user of a mobile computing device 100.

The computing device comprising the device management system 100 may form part of a wired communications system, a wireless communications system, or a combination of both. For example, the computing device may be arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The computing device may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. In wireless implementations, the mobile computing device may comprise one more interfaces and/or components for wireless communication such as one or more transmitters, receivers, transceivers, amplifiers, filters, control logic, wireless network interface cards (WNICs), antennas, and so forth. Although certain embodiments may be illustrated using a particular communications media by way of example, it may be appreciated that the principles and techniques discussed herein may be implemented using various communication media and accompanying technology.

The processor 102 may comprise a general purpose processor or an application specific processor arranged to provide general or specific computing capabilities for the device management system 100. In various embodiments, the processor 102 may comprise a single or multi-core processor. Examples for processor 102 may include without limitation a central processing unit (CPU), multi-processing unit, a reduced instruction set computer (RISC), a processor that have a pipeline, a complex instruction set computer (CISC), digital signal processor (DSP), a controller, a micro-controller, embedded controller, integrated controller, and so forth. In one embodiment, for example, the processor 102 may be implemented as a secure processor configured to perform selected cryptographic engine functions. It may be appreciated that the device management system 100 may use any suitable number of processors in accordance with the described embodiments.

The memory 104 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information. In one embodiment, for example, the memory 104 may be implemented using a secure non-volatile flash memory. The embodiments, however, are not limited in this context.

The chipset 106 may comprise a set of specialized integrated circuits or "chips" that are designed to work together. As shown, the chipset 106 comprises two chips denoted as hubs 108, 110. The chipset 106 may be mounted to a circuit board (e.g., motherboard, baseboard, system board, logic board, etc.) that comprises or supports various system components and features in addition to the chipset such as a central processing unit (CPU), a basic I/O system (BIOS), memory (e.g., volatile or non-volatile memory, removable or non-removable memory, erasable or non-erasable memory, writeable or re-writeable memory) such as double-data-rate two synchronous dynamic random access memory (DDR2) and flash memory, a network interface card (NIC) (e.g., Ethernet LAN adapter, WNIC), controllers such as an embedded controller (EC), system management controller (SMC), keyboard controller (KBC), and/or LAN controller, a clock such as a real-time clock (RTC), as well as other components and features in accordance with the described embodiments.

The circuit board also may comprise or support various interfaces and connectors such as video graphics array (VGA), low-voltage differential signaling (LVDS), TV-out (e.g., D-connector, S-Video, component video, composite video), serial digital video out (SDVO), peripheral component interconnect (PCI), PCI Express, on-board LAN, serial peripheral interface (SPI), Advanced Technology Attachment (ATA), Universal Serial Bus (USB), Low Pin Count (LPC), Infrared Data Association (IrDA), universal asynchronous receiver/transmitter (UART), system management bus (SMBus), and other interfaces and connectors in accordance with the described embodiments.

The chipset 106 may comprise the memory controller 108. The memory controller 108 may generally manage memory operations for the device management system 100. In one embodiment, for example, the memory controller 108 may be implemented as a Graphics and Memory Controller Hub (GMCH) referred to as a "northbridge" when the processor 102 is implemented as a processor made by Intel® Corporation, Santa Clara, Calif. The northbridge typically handles communications among the processor 102, memory 104, basic input/output system (BIOS) read-only memory (ROM), peripheral component interconnect express (PCI Express) (or accelerated graphics port) video cards, and the platform controller 110.

The chipset 106 may comprise the platform controller 110. In one embodiment, for example, the platform controller may be implemented as an Input/Output (I/O) Controller Hub (ICH) referred to as a "southbridge" supporting Intel Active Management Technology (AMT). The southbridge is a chip that implements the "slower" capabilities of a motherboard in a northbridge/southbridge chipset computer architecture. The southbridge can usually be distinguished from the northbridge by not being directly connected to the processor 102. Rather, the northbridge ties the southbridge to the processor 102. Through the use of controller integrated channel circuitry, the northbridge can directly link signals from the devices 116-1-$m$ to the processor 102 for data control and access.

The platform controller 110 may comprise the host controller 112. The host controller 112 may comprise an embedded processing device on the chipset 106 implemented by a computing platform and/or computing device. The host controller 112 connects a host system (e.g., a computer system) to other network and storage devices, such as the devices 116-1-$m$. The host controller 112 provides physical and logical elements to allow external buses to communicate with internal buses used by the computer system. The host controller 112 contains electronics and firmware needed to execute bus transactions in accordance with a given bus protocol. The host controller 112 is typically controlled by a device driver linked to the operating system 120, such as the device manager 130. The host controller 112 may sometimes be referred to as a host adapter or host bus adapter (HBA).

In various embodiments, the host controller 112 may comprise a serial advanced technology attachment (SATA) controller for the bi-directional serial links 118-1-$n$ connected to the devices 116-1-$n$. The SATA Specification provides definitions for hardware and software needed to implement a storage-interface for connecting host bus adapters to input/output (I/O) devices, such as mass-storage devices including hard disk drives and optical drives. SATA host bus adapters and devices communicate via a high-speed serial cable over two or more pairs of conductors. As shown in FIG. 1, the host controller 112 implements the interface 114 to communicate with the devices 116-1-$m$ over respective bi-directional data links 118-1-$n$.

The host controller 112 may comprise the interface 114. The interface 114 may define operations for the host controller 112 in a general manner to allow the host controller 114 to work with different types of devices 116-1-$m$ in accordance with any number of interconnect, bus or link protocols and definitions.

In various embodiments, the interface 114 may be implemented as a SATA advanced host controller interface (AHCI) between the controller 112 and the devices 116-1-$m$ connected by the bi-directional serial links 118-1-$n$. The AHCI Specification describes a system memory structure for computer hardware vendors to exchange data between host system memory (e.g., memory 104) and attached storage-devices (e.g., devices 116-1-*m*).

The host controller 112 may connect to one or more devices 116-1-*m*. The devices 116-1-*m* may comprise any electronic device capable of connecting and disconnecting from the device management system 100 and its internal interconnects via the platform controller 110. The devices 116-1-*m* may attach to a host system but whose primary functionality is not dependent upon the host system, and can therefore be considered to expand functionality for the host system without forming part of the host system's core architecture. Examples for the devices 116-1-*m* may include without limitation I/O devices, storage devices, mass storage devices, peripheral devices, printers, scanners, tape drives, hard drives, optical drives, magnetic drives, microphones, speakers, video cameras, digital cameras, displays, expansion cards, controllers, computer hardware, single-board computers, blades, modular platform components, and so forth. In various embodiments, the devices 116-1-*m* may comprise SATA devices, such as a hard disk drives and optical drives. The embodiments, however, are not limited in this context.

The host controller 112 and the devices 116-1-*m* may communicate over corresponding bi-directional serial links 118-1-*n*. The bi-directional serial links 118-1-*n* may comprise high-speed bi-directional serial links suitable for data transfers between the device management system 100 and the devices 116-1-*m*. The bi-directional serial links 118-1-*n* may each comprise data cables with multiple conductors or transmission lines, and suitable connectors for attaching to the controller 112 and the devices 116-1-*m*.

In various embodiments, the bi-directional serial links 118-1-*n* may be implemented as SATA bi-directional serial links. The SATA Specification defines a data cable with seven conductors (3 grounds and 4 active data lines in two pairs) and 8 mm wide wafer connectors on each end. SATA cables can have lengths up to 1 meter (3.3 ft), and connect one motherboard socket to one hard drive.

In various embodiments, the bi-directional serial links 118-1-*n* may be implemented as a SATA system-to-system interconnect (eSATA) for external storage applications. eSATA provides a variant of SATA meant for external connectivity. eSATA is a system-to-system interconnect suitable for external desktop applications. eSATA has revised electrical requirements in addition to different cables and connectors from typical SATA compliant technologies. The SATA Specification features a specific connector designed for rough handling, similar to the regular SATA connector, but with reinforcements in both the male and female sides, inspired by the universal serial bus (USB) connector. eSATA resists inadvertent unplugging, and can withstand yanking or wiggling which would break a male SATA connector (the hard-drive or host adapter, usually fitted inside the computer). With an eSATA connector, considerably more force is needed to damage the connector, and if it does break it is likely to be the female side, on the cable itself, which is relatively easy to replace.

As shown, the device management system 100 may comprise a power controller 150 connected to a power supply 140 such as an Advanced Technology Extended (ATX) power supply, a battery pack, and/or an alternating current (AC) power supply. In various implementations, the power controller 150 may be arranged to power down various aspects of the chipset 106 comprising the host controller 112, and the power supply 140 may be arranged to switch between AC and battery power. For example, the power controller 150 may be arranged to implement power saving measures and gate power to the chipset 106 when the power supply 140 switches from AC power to battery power. In various embodiments, the power controller 150 and the chipset may support sleep (Sx) states including the S0—power on state, the S3—Standby or suspend to RAM state, the S4—hibernate or suspend-to-disk state, and the S5—soft off state in accordance with Advanced Configuration and Power Interface (ACPI) Specification, Revision 3.0b, published Oct. 10, 2006.

The power controller 150 may be implemented by one or more controllers (e.g., microcontroller), hardware board connections, or any combination thereof, as desired for a given set of design parameters or performance constraints. In some embodiments, the power controller 150 may be implemented as an embedded controller comprising an original equipment manufacturer (OEM) component of company other than the manufacturer of the chipset 106. In some embodiments, the power controller 150 may be implemented by a power management controller (PMC) comprising a component supplied by the manufacturer of the chipset.

The memory 104 may store the OS 120 and device manager 130 as software components suitable for execution by the processor 102. The OS 102 may comprise any suitable OS for a computing device. The device manager 130 may comprise a device driver. In computing, a device driver or software driver is a computer program allowing higher-level computer programs to interact with a hardware device. A device driver typically communicates with a hardware device through a computer bus or communications subsystem to which the hardware connects. When a calling program invokes a routine in the driver, the driver issues commands to the hardware device. Once the hardware device sends data back to the driver, the device driver may invoke routines in the original calling program. Device drivers are typically hardware-dependent and operating-system-specific. They usually provide the interrupt handling required for any necessary asynchronous time-dependent hardware interface.

In various embodiments, the device manager 130 may comprise a device driver for the host controller 112 and/or the devices 116-1-*m*. In some embodiments, the device manager 130 may comprise a SATA device driver linked to the OS 120 and arranged to control operations for the host controller 112. In one embodiment, for example, the device manager 130 may be implemented as an Intel Matrix Storage Manager (IMSM) device driver, as made by Intel Corporation. The embodiments, however, are not limited in this context.

When the host controller 112 is implemented as a SATA controller and the interface 114 is implemented as a SATA AHCI interface, the host controller 112 and the interface 114 provides "hot-plugging" or "hot-swapping" capabilities for the devices 116-1-*m* in accordance with the SATA Specification and AHCI Specification. Hot-plugging allows removing and replacing components within a computer system, while the system is operating. The hot-plugging benefit is very useful for many mobile computer users because the mobile computer's limited size rarely allows it enough drive bays to concurrently run an extra hard disk drive, a CD-ROM drive, a DVD drive, or any other number of hardware peripherals. Thus, hot-plugging between two or more of these devices is very beneficial to a mobile computer user to allow work to continue without requiring a reboot.

Additionally, as computers become more powerful and more portable, the need for power savings increases to allow longer battery life, decrease total system weight, and decrease the necessary expensive thermal solution requirements among other benefits. The host controller 112 and the interface 114 therefore provide for power management techniques for SATA devices. For instance, a SATA device may have multiple power management states, including an "active"

power management state (e.g., PHYRDY), a "partial" power management state, and a "slumber" power management state. The active power management state is when the physical (PHY) layer logic and main PLL are both on and active. The interface is synchronized and capable of receiving and sending data. The partial power management state is when the PHY logic is powered, but is in a reduced power state. Both signal lines on the interface are at a neutral logic state (or common mode voltage). The slumber power management state is when the PHY logic is powered but is in a reduced power state. The common mode level of the AC coupled transmitter is allowed to float (while maintaining zero differential) as long as it remain within the limits cited in the SATA Specification entry AC coupled common mode voltage. In general, the active power management state consumes the most power from the power supply 140, with the partial and slumber power management states consuming less power than the active power management state. The partial power management state consumes lower power than the active power management state but more than the slumber power management state, and the slumber power management state consumes lower power than the partial power management state. It is worthy to note that the different power management states refer to link power management and not necessarily device power states (e.g., D0, D1, D2, D3, which correspond to the S-states S0, S1, S3, S4).

Although SATA devices do allow hot-swapping, the current SATA AHCI Specification create a conflict where the hot-swap capabilities and SATA power management are mutually exclusive. When a SATA or eSATA device is hot-plug removed, an interrupt occurs from the host controller 112 to the device manager 130 that causes the device manager 130 to enumerate or re-enumerate all devices for the device management system 100. This enumeration operation allows for physical devices that were exported to the OS 120 to effectively be removed. However, when a link 118-1-n is in a lower power management state (partial or slumber) and a device 116-1-m is hot-plug removed, the host controller 112 and the interface 114 cannot detect the removal and therefore no interrupt is generated. No interrupt means that the removed device 116-1-m will continue to be exported to the OS 120 as though the removed device 116-1-m were still present, which may potentially degrade system performance.

To solve these and other problems, the device manager 130 may implement a device connection manager 132 that allows simultaneous power management and detection of removed devices 116-1-m when the host controller 112, the interface 114, the links 118-1-m, and/or the devices 116-1-m are in a lower power management state. In various embodiments, the device connection manager 132 may comprise a software component that employs an algorithm that periodically brings the SATA and/or eSATA external PHY on the AHCI interface 114 of the host controller 112, and subsequent SATA link 118-1-m, out of a lower power management state on a periodic basis to allow for interrupts from hot-plug removals to be detected by the host controller 112 and the interface 114. The device connection manager 132 employs a technique in which a software-only timer fires every one second and performs the following actions: (1) brings the link 118-1-m out of a lower power management state to an active power management state; (2) delays for a defined time interval (e.g., 10 ms); (3) returns the link 118-1-m to the lower power management state; and (4) resets the timer.

Implementing a software based solution to solve the mutually-exclusive problem of power management and hot-plug removal detection provides several advantages over conventional techniques. For instance, a software algorithm contains no hardware dependencies and provides a way for legacy devices to enable SATA and eSATA hot plug capability and link power management simultaneously. The software algorithm has been fine tuned to allow for negligible power consumption loss. Also, the defined time interval (e.g., 10 ms delay) within the software algorithm allows for any out of band (OOB) signaling to finish before putting the link 118-1-m back into the lower power management state. This delay also allows for the PHY to receive any traffic from the device 116-1-m for that extra duration. Other advantages exist as well.

Figure 2:
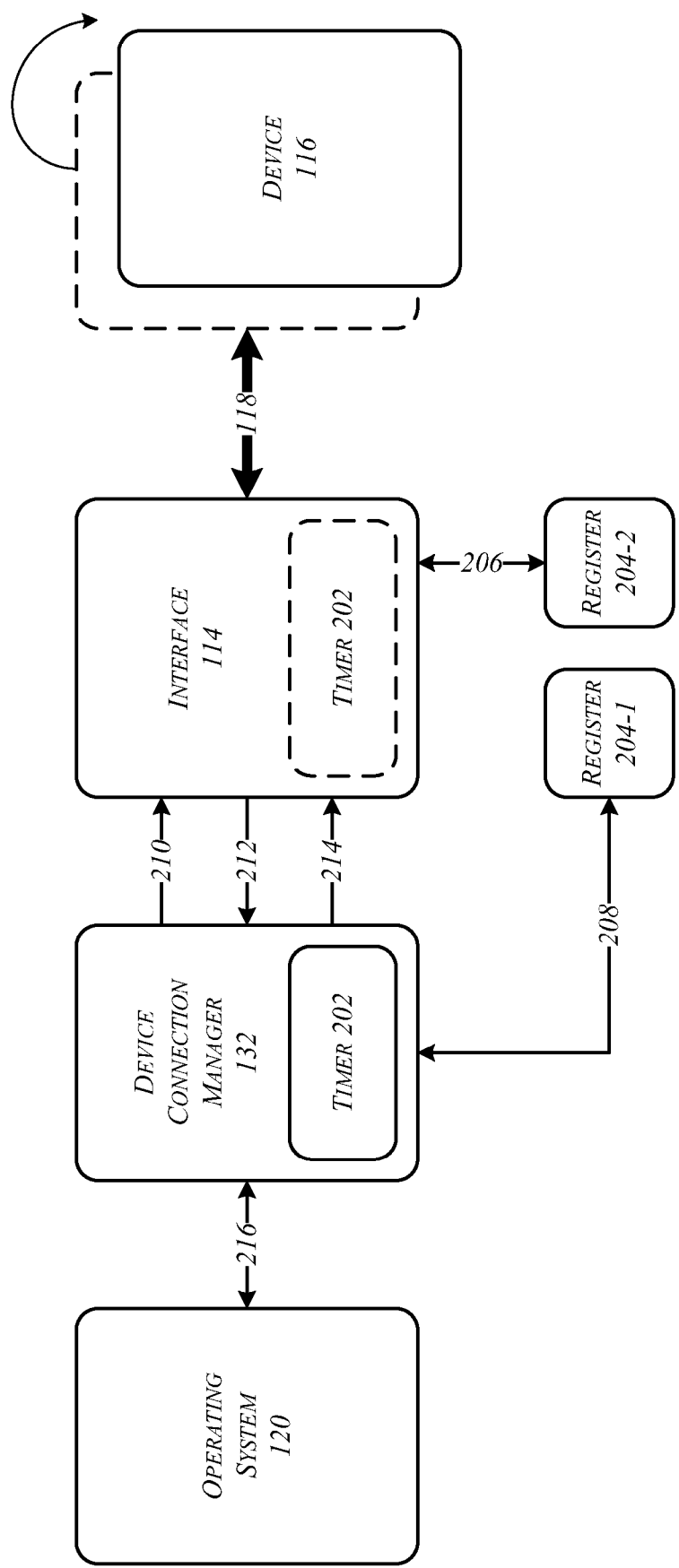
FIG. 2 illustrates one embodiment of a first apparatus.

FIG. 2 illustrates an apparatus 200. The apparatus 200 comprises portions of the device management system 100 and further illustrates signals or messages communicated between the various components of the device management system 100. In particular, the apparatus 200 illustrates interactions between the OS 120, the device connection manager 132, the interface 114 (and host controller 112), and a device 116. Although FIG. 2 may show a limited number of elements by way of example, it can be appreciated that a greater or a fewer number of elements may be employed for a given implementation.

In the illustrated embodiment shown in FIG. 2, the processor 102 may execute the device connection manager 132 stored in the memory 104. The device connection manager 132 may comprise part of the device manager 130 to control operations for the host controller 112 and the interface 114, and thereby the bi-directional serial link 118 connecting the device 116 to the host controller 112. In one embodiment, for example, the device connection manager 132 may be implemented in accordance with the following pseudo-code:

---

One second timer calls the following routine:
TimerRoutine( parameters )
{
// Get the AHCI register values associated with link power management status.
Read Appropriate AHCI/ICH registers that contain LPM status.
Check to see if we are in a link power state first.
If we are in a link power state then save off the state and continue on.
If we are not in a link power state then move on and come back one second later.//
If ( (AHCI_Register.LPM_Status == PARTIAL_SLUMBER_LPM_STATE) or
(AHCI_Register.LPM_Status == SLUMBER_LPM_STATE) ) then
{
// Set the SATA link to active
AHCI_Register.LPM_Control = LINK_ACTIVE;
Write to AHCI register set;
Stall for 10 milliseconds to allow for COMRESET/COMINIT to finish arbitrating;
// Put the link back into the original state that it was in.
AHCI_Register.LPM_Control = AHCI_Register.LPM_Status;

-continued

```
Write to AHCI register set;
}
Reset timer to come back 1 second later to perform this same algorithm
} // end timerRoutine
```

When executed, the device connection manager 132 may be operable to read one or more registers 204-1-*p* of the host controller 112 as indicated by arrow 208. The register 204 may store information indicating the interface 114 of the host controller 112 for the bi-directional serial link 118 is operating in a lower power management state. For instance, one or more bits for the register 204-1 may be toggled to indicate a lower power management state.

The device connection manager 132 may send a control directive 210 on a periodic or aperiodic basis for the interface 114 to transition to a temporary active state. A first defined time interval between sending control directives 210 may vary according to different implementations, although an upper boundary should be long enough to capture a hot-swap removal event, and a lower boundary should be short enough to reduce impact on power management savings. Typical values for this defined time interval may be anywhere from 1 second to 10 seconds. In one embodiment, for example, the defined time interval between sending control directives 210 is set at 1 sec. The embodiments, however, are not limited in this context.

The phrase "temporary active state" may refer to transitioning to the active power management state for a defined time interval before reverting back to the lower power management state. A second defined time interval for a temporary active state may vary according to different implementations, although an upper boundary should be long enough to allow OOB signaling to finish before placing the link 118 back into a lower power management state, and a lower boundary should be short enough to reduce impact on power management savings. Typical values for this defined time interval may be anywhere from 1 ms to 1 sec. In one embodiment, for example, the defined time interval for a temporary active state is set at 10 ms. The embodiments, however, are not limited in this context.

The device connection manager 132 may implement a software delay timer 202 to measure a particular defined time interval. The delay timer 202 may measure the first and second defined time intervals set for the device connection manager 132. Additionally or alternatively, the interface 114 may implement the delay timer 202. This allows the interface 114 to determine when to resume a lower power management state. An advantage to this implementation is that it reduces signaling between the device connection manager 132 and the interface 114. A disadvantage is that it may require modifications to the interface 114, which may not be desirable for legacy controllers and interfaces.

When the interface 114 receives the control directive 210, it transitions from a lower power management state to an active power management state for the second defined time interval. The interface 114 may now generate interrupts when a device disconnect state is detected. This may be detected using hardware based solutions, such as through detection control logic and a pulse transmission and sensing circuit, as described in more detail with reference to FIG. 3. When a device disconnect state has been detected, the host controller 112 may store this information in the register 204-2.

The interface 114 may determine whether a device disconnect state has occurred by reading the register 204-2 as indicated by arrow 206. For instance, one or more bits may be toggled to indicate the device disconnect state. The interface 114 may read the register 204, generate an interrupt 212, and send the interrupt 212 to the device connection manager 132. The device connection manager 132 may receive an interrupt 212 from the interface 114, and interpret the interrupt 212 to understand that the device 116 has been disconnected from the bi-directional serial link 118 during a temporary active state for the interface 114.

When a device disconnect state has not been detected, and the device connection manager 132 has not received an interrupt during the second defined time interval as measured by the delay timer 202, then the device connection manager 132 may send a control directive 214 to the interface 114 to instruct the interface 114 to resume the lower power management state when the delay timer 202 expires. The device connection manager 132 may then reset the delay timer 202 to the defined time interval.

Figure 3:
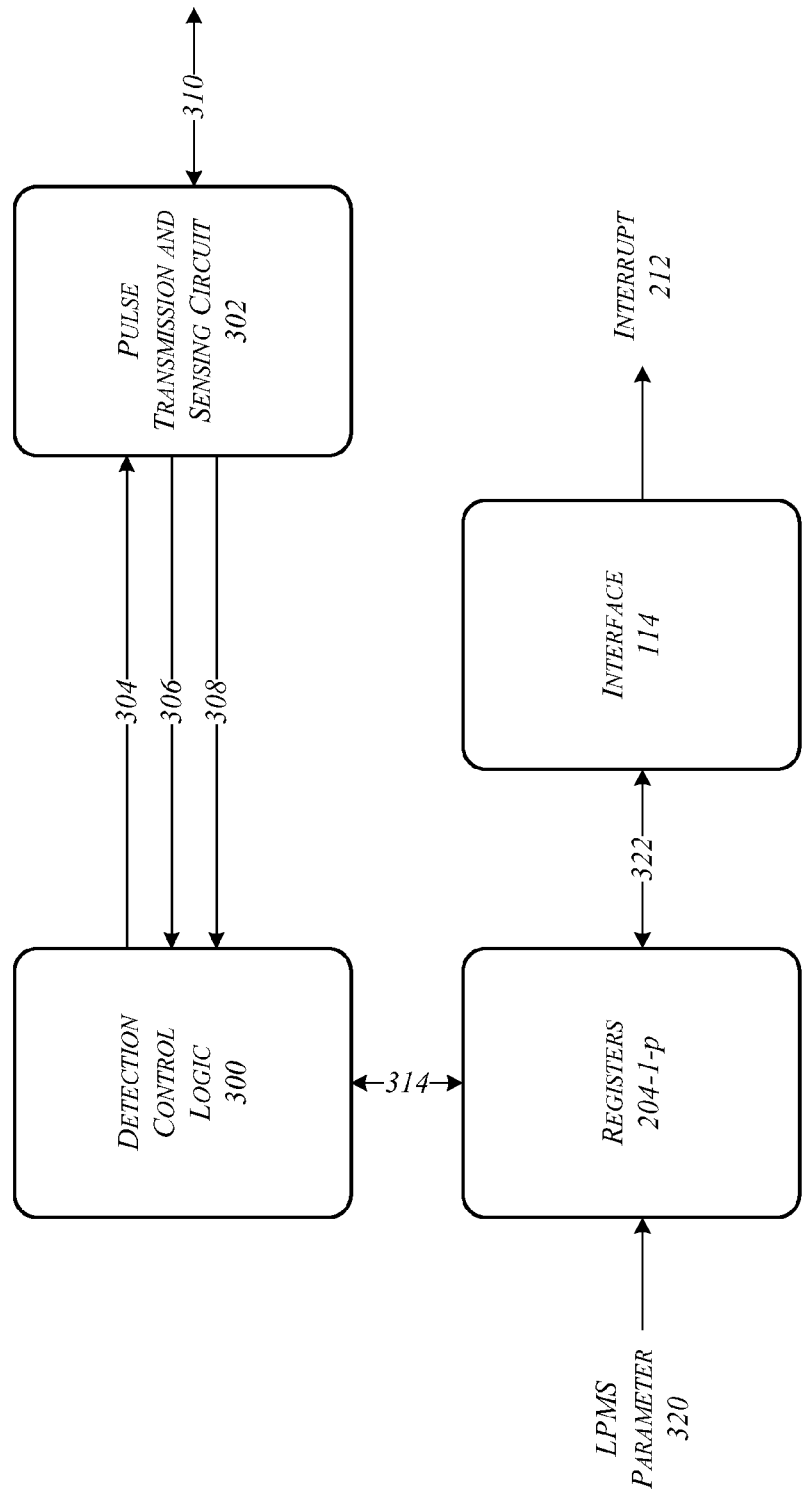
FIG. 3 illustrates one embodiment of a second apparatus.

FIG. 3 illustrates a more detail block diagram for the host controller 112. FIG. 3 shows one embodiment of the additional SATA logic and circuitry required for allowing hot-plugging/hot-unplugging of SATA devices while in a lower power management state. As shown, the host controller 112 may comprise detection control logic 300, a pulse transmission and sensing circuit 302, the registers 204-1-*p*, and the interface 114. Although FIG. 3 may show a limited number of elements by way of example, it can be appreciated that a greater or a fewer number of elements may be employed for a given implementation.

The detection control logic 300 may connect to a bi-directional serial link 118-1-*n*, and determine when a device 116-1-*m* is disconnected from the bi-directional serial link 118-1-*n*. The detection control logic 300 may then store this information indicating a device disconnect state in the register 204-2 of the host controller 112. The detection control logic 300 may determine whether the device 116-1-*m* is disconnected from the bi-directional serial link 118-1-*n* based on a length of a bi-directional serial link charge time. This may be determined by the pulse transmission and sensing circuit 302.

The pulse transmission and sensing circuit 302 may connect to the detection control logic 300. The pulse transmission and sensing circuit 302 may send a step pulse across the bi-directional serial link 118-1-*n* and determine a length of time the bi-directional serial link 118-1-*n* takes to charge from common mode voltage to supply voltage.

More particularly, detection control logic 300 (also referred to as SATA core logic) is coupled to the pulse transmission and sensing circuit 302 by the detect_enable 304, detect_pulse 306, and disconnect_detect 308 signal lines. The pulse-transmission and sensing circuit 302 is additionally coupled to the SATATXp (SATA transmission line) 310. The detection control logic 300, with the help of the pulse-transmission and sensing circuit 302, can detect whether a SATA device 116-1-*m* is coupled to (e.g., plugged into) the SATATXp 310 by measuring the amount of time it takes the SATATXp to charge up from common mode voltage (Vcm) to positive supply voltage (Vcc) and then return to Vcm. In a different embodiment, the supply voltage could be negative.

In the current embodiment where the supply voltage is positive, the rate of charging up to Vcc depends on the presence of three capacitances present in the system, as follows:

1. The capacitance of discrete capacitors connected on the host controller's transmission (TX) lines. The maximum capacitance is 12 nF per the SATA Specification. The minimum capacitance is unspecified in the specification but 2.5 nF is the lowest known in existing systems.
2. The capacitance of the SATA cable. This capacitance is.about.1 pF/inch up to 2 meters in the case of external SATA.
3. The capacitance of discrete capacitors on the device reception (RX) lines if a device is present. This capacitance is typically 2.5 nF.

It is worthy to note that the effect of the second capacitance is negligible due to the cable capacitance having a 2 or 3 order of magnitude smaller capacitance than the first and third capacitances.

Returning to FIG. 3, the pulse transmission and sensing circuit 302 can be activated by the detection control logic 300 once the SATA interface is put into the SATA Listen Mode or a SATA low power state whereby the normal SATA physical transmission on the SATATXn/p lines has completely ceased.

The detection control logic 300 enables the pulse transmission and sensing circuit 302 by asserting the detect_enable signal 304. At this point, the detection control logic 300 begins to transmit an active-low pulse, detect_pulse 306, for a duration ≥3 µs. In one embodiment, the duration is 5 µs for additional guard band. As described above, the active-low pulse causes the pulse-transmission and sensing circuit 302 to charge up on the SATATXp line from Vcm to Vcc and then return to Vcm after the 5 µs duration. Once the SATATXp line has charged up sufficiently, the pulse transmission and sensing circuit 302 sends a device_detection signal 308 to indicate the line has charged from Vcm to Vcc. The more capacitance there is on the SATATXp line, the longer it takes the line to charge to Vcc. Thus, because the SATATXp line has more capacitance when a device is plugged in, it takes the line considerably longer to charge to Vcc with a device present.

Therefore, the detection control logic 300 can determine whether a device is present on the SATATXp line 310 depending on the amount of time it takes between sending the detect_pulse 306 to receiving the device_detection signal 308. In this embodiment, based on the known capacitances shown above, it can be determined that there is not a device present if the device_detection signal 308 returns to the detection control logic 300 within 3 µs of the detection control logic 300 sending the detect_pulse 306. Otherwise, if the time between those two events takes longer than 7 µs, the detection control logic 300 can determine that a device is present. In one embodiment, sampling 1 µs after the assertion of the detect_pulse 306 determines if a device is present or not. In another embodiment, sampling after 3 µs also determines if a device is present or not and adds additional guard band and may eliminate low probability corner case sampling errors.

Finally, in one embodiment, the detection control logic 300 also is coupled through one or more data lines to the registers 204-1-p. The registers 204-1-p may comprise, for example, AHCI status registers used for interrupt generation within the SATA host controller 112 to report the status of the device 116-1-m to the host controller 112 when the status has changed from connected to unconnected. The registers 204-1-p may store status bits indicating when a device disconnect state has occurred. The registers 204-1-p may also store status bits representing a lower power management state parameter 320.

As discussed with reference to FIG. 2, the device connection manager 132 and/or the interface 114 may read the status bits stored in the registers 204-1-p to detect lower power management states and device disconnect states, among other useful types of information.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
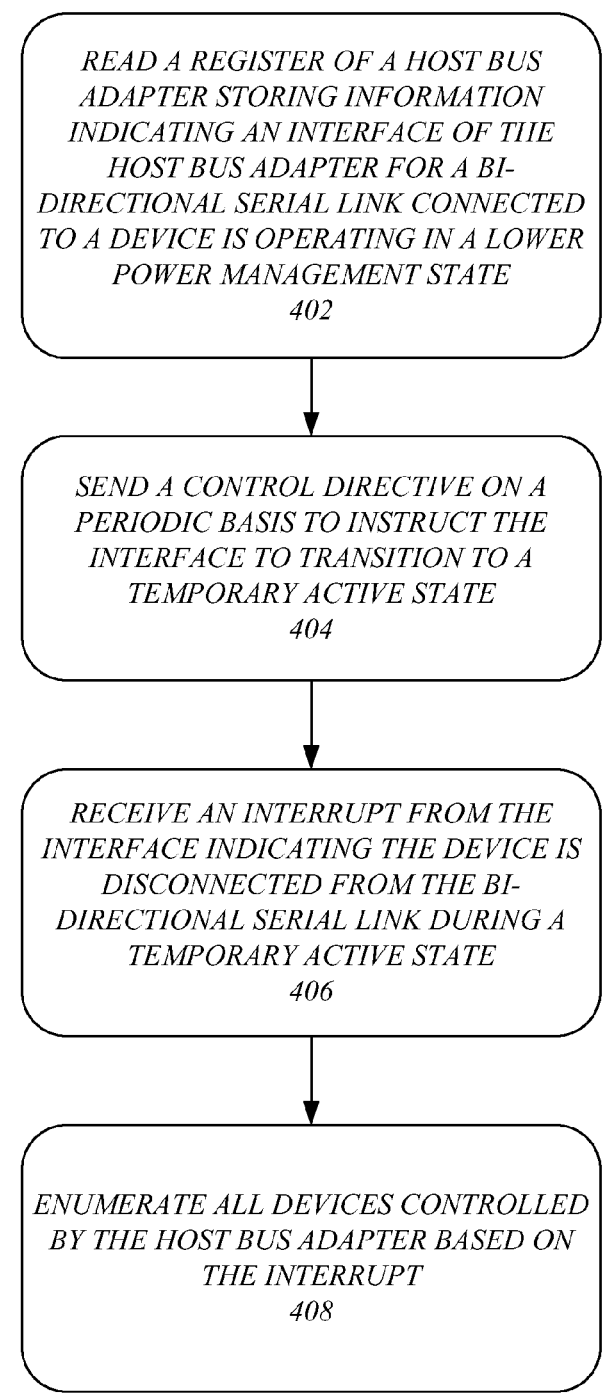
FIG. 4 illustrates one embodiment of a first logic flow.

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may read a register of a host bus adapter storing information indicating an interface of the host bus adapter for a bi-directional serial link connected to a device is operating in a lower power management state. For example, the device connection manager 132 may read the register 204-1 of the host controller 112 (or host bus adapter) storing information indicating the interface 114 and/or the host controller 112 for a bi-directional serial link 118-1-n connected to a device 116-1-m is operating in a lower power management state (e.g., partial or slumber).

In one embodiment, the logic flow 400 may send a control directive on a periodic basis to instruct the interface to transition to a temporary active state. For example, the device connection manager 132 may send the control directive 210 on a periodic basis (e.g., every 1 sec) to instruct the interface 114 and/or the host controller 112 to transition to a temporary active state. The temporary active state may be for a defined time interval (e.g., 10 ms).

In one embodiment, the logic flow 400 may receive an interrupt from the interface indicating the device is disconnected from the bi-directional serial link during a temporary active state. For example, the device connection manager 132 may receive the interrupt 212 from the interface 114 and/or the host controller 112 indicating the device 116-1-m is disconnected from the bi-directional serial link 118-1-n during a temporary active state (e.g., 10 ms of active power management state).

In one embodiment, the logic flow 400 may enumerate all devices controlled by the host bus adapter based on the interrupt. For example, the device connection manager 132 may enumerate all devices 116-1-m controlled by the host controller 112 based on the interrupt 212. This enumeration operation allows for physical devices that were exported to the OS 120 to effectively be removed.

Figure 5:
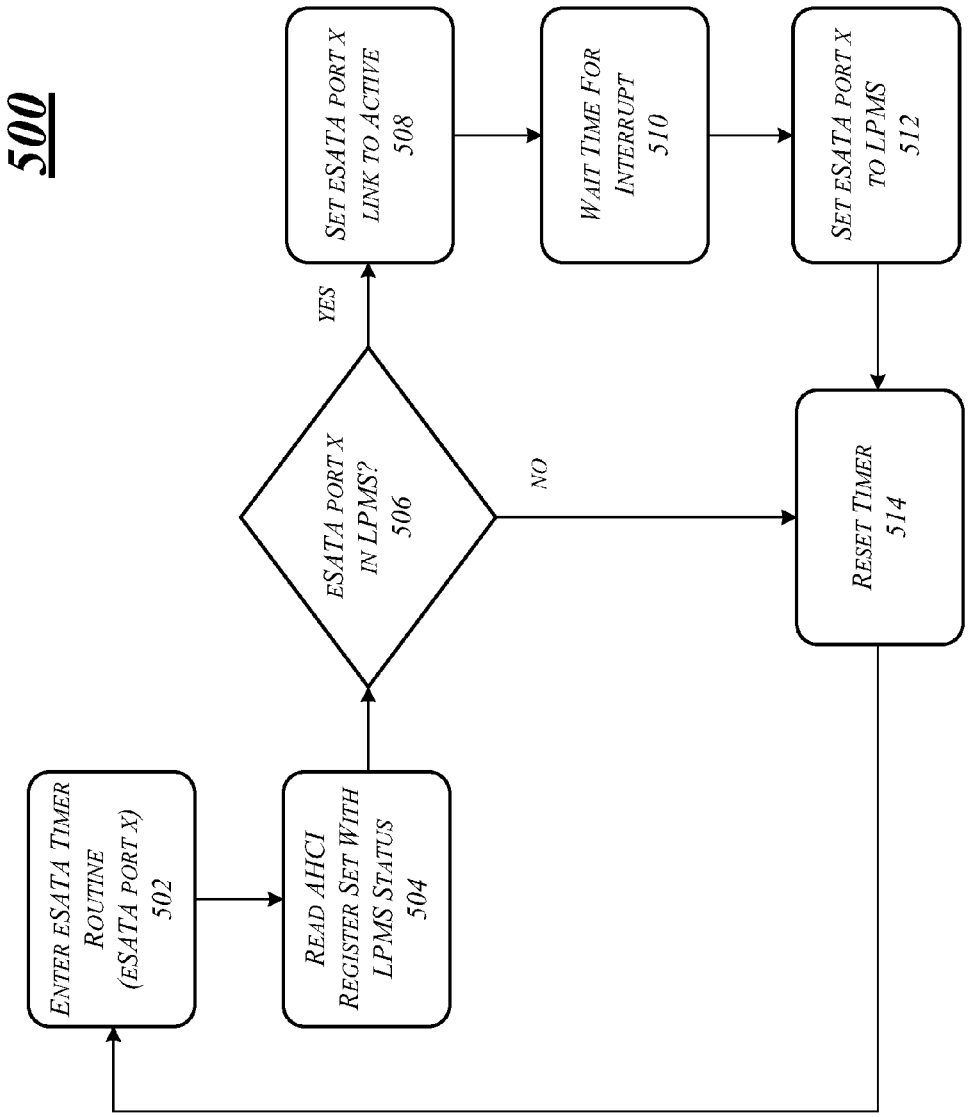
FIG. 5 illustrates one embodiment of a second logic flow.

FIG. 5 illustrates one embodiment of a logic flow 500. The logic flow 500 may be representative of some or all of the operations executed by one or more embodiments described herein. More particularly, the logic flow 500 may illustrate a more detailed software algorithm implemented by the device connection manager 132.

As shown in FIG. 5, the logic flow 500 may enter a SATA or eSATA timer routine for a port x of the interface 114 at block 502. Port x may refer to a port of the interface 114 corresponding to a link 118-1-*n* connecting the host controller 112 with a device 116-1-*n*. A register 204-1 may be read to determine whether port x has been set to a lower power management state at block 504. This information may be stored in other memory accessible to the device connection manager 132, such as the memory 104, for example. If port x has not been set to a lower power management state at block 504, then the delay timer 202 is reset and the timer routine continues at block 502. If port x has been set to a lower power management state at block 504, then port x is set to an active power management state at block 508. Port x remains in the active power management state until the delay timer 202 expires and/or a control directive 214 is received from the device connection manager 132 at block 510. Upon expiration of the delay timer 202 or receipt of the control directive 214, port x is set or reset to the same or different lower power management state saved to the memory 104 at block 512.

Figure 6:
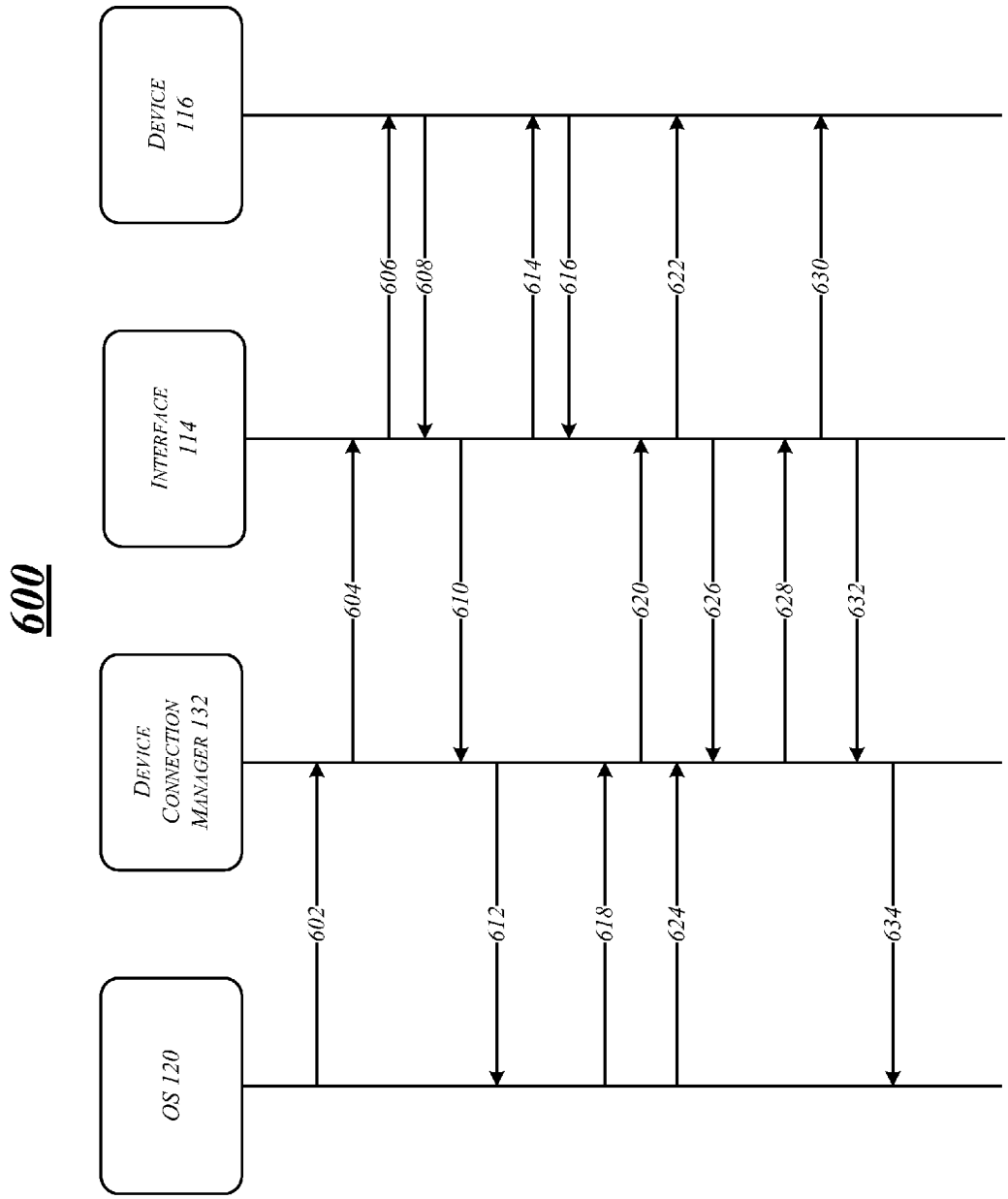
FIG. 6 illustrates one embodiment of a first message flow.

FIG. 6 illustrates one embodiment of a message flow 600. The message flow 600 may be representative of some or all of the operations executed by one or more embodiments described herein. More particularly, the message flow 600 may illustrate a message flow representing SATA hot-plug removal during link power management sequences.

In the illustrated embodiment shown in FIG. 6, the message flow 600 may begin by the OS 120 sending a Transport Layer Command A to the device connection manager 132 as indicated by arrow 602. The device connection manager 132 may send a SATA Command A to the interface 114 as indicated by arrow 604. The interface 114 may send a SATA FIS(s) CMD A to a device 116 as indicated by arrow 606. The device 116 may send a CMD A Response to the interface 114 as indicated by arrow 608. The interface 114 may send the CMD A response to the device connection manager 132 as indicated by arrow 610. The device connection manager 132 may send a Transport Layer Response CMD A to the OS 120 as indicated by arrow 612.

At some point, assume the power controller 150 instructs the device 116 to enter a lower power management state by sending a PMREQ_Partial/Slumber as indicated by arrow 614. The device 116 sends a PMACK and enters the lower power management state as indicated by arrow 616. The device 116 and its corresponding link 118 and port of the interface 114 also transition to the lower power management state of the device 116.

The OS 120 sends a Transport Layer Command B to the device connection manager 132 as indicated by arrow 618. The device connection manager 132 wakes up the link 118 and queues up the Command B for transmission by sending notification to the interface 114 as indicated by arrow 620. The interface 114 sends a COMWAKE to the device 116 as indicated by arrow 622. However, the device 116 has been removed or disconnected from the link 118. The interface 114 recognizes a COMWAKE timeout detection indicating that no response has been received by the interface 114. The interface 114 then sends notification to the device connection manager 132 indicating that the device 116 has been removed or disconnected as indicated by arrow 626. In the interim, the OS 120 has sent a Transport Layer Command C to the device connection manager 132 as indicated by arrow 624. Both Commands B, C are not executed due to the removal of the device 116.

Once the device connection manager 132 has been informed that the device 116 has been removed, the device connection manager 132 may send a control directive to the interface 114 to enumerate or re-enumerate all ports to determine current topology as indicated by arrow 628. The interface 114 attempts OOB negotiation with the removed device 116 as indicated by arrow 630, and times out. The interface 114 sends another notification to the device connection manager 132 indicating the device 116 is not connected as indicated by arrow 632. The device connection manager 132 attempts to clean up all I/O to the removed device 116 before commands B, C time out. The device connection manager 132 sends notification to the OS 120 that the device 116 is now missing as indicated by arrow 634. The Commands B, C may or may not time out at this point. In either case, the OS 120 resolves all queued I/O for the removed device 116.

Figure 7:
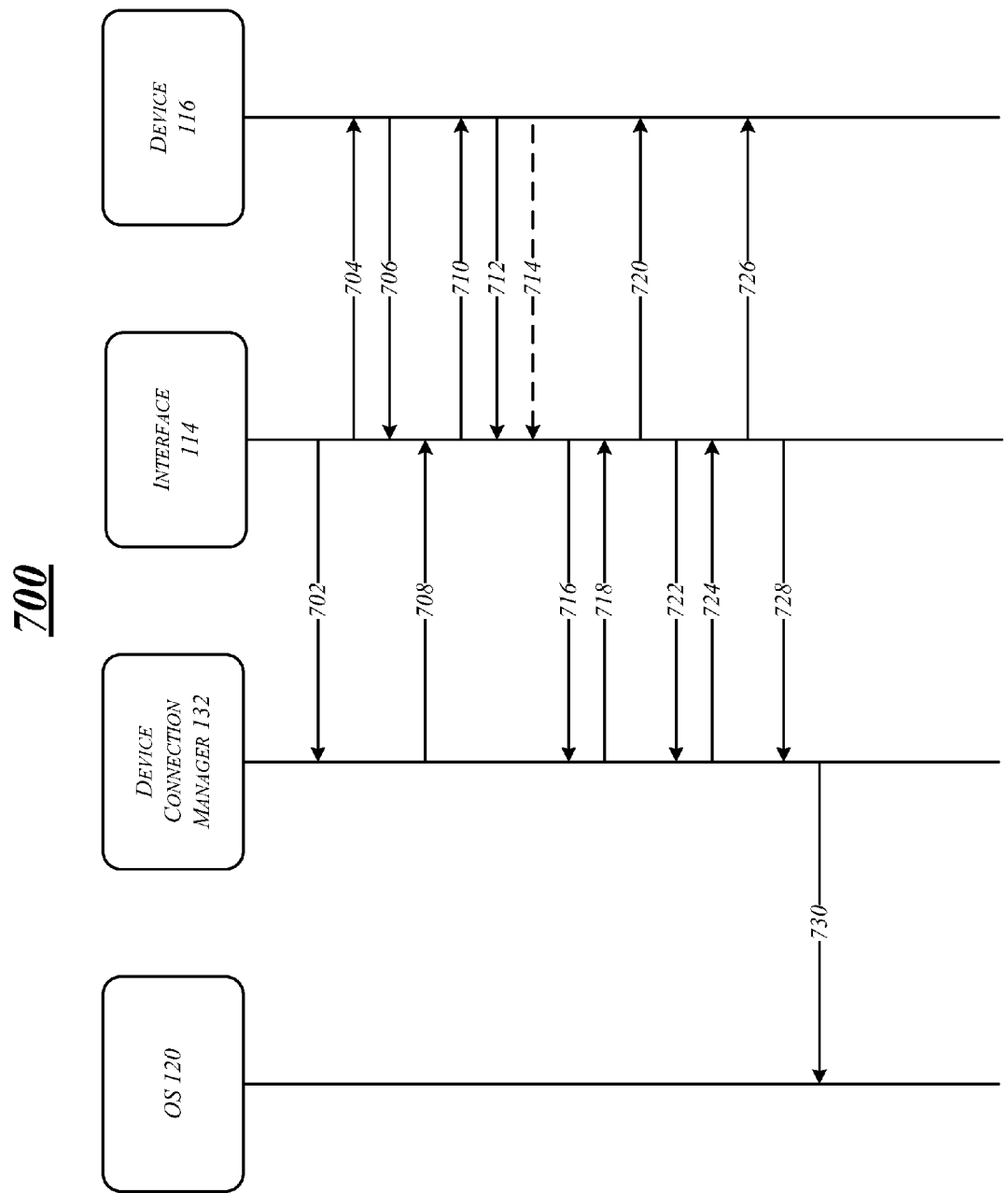
FIG. 7 illustrates one embodiment of a second message flow.

FIG. 7 illustrates one embodiment of a message flow 700. The message flow 700 may be representative of some or all of the operations executed by one or more embodiments described herein. More particularly, the message flow 700 may illustrate another message flow representing SATA hot-plug removal during link power management sequences.

In the illustrated embodiment shown in FIG. 7, the message flow 700 may begin by the interface 114 sending a Previous Command Response to the device connection manager 132 as indicated by arrow 702. The interface 114 sends a PMREQ_Partial/Slumber to the device 116 as indicated by arrow 704. The device 116 sends a PMACK and enters the lower power management state as indicated by arrow 706. The device 116 and its corresponding link 118 and port of the interface 114 also transition to the lower power management state of the device 116.

In the interim, the device connection manager 132 begins the software algorithm to periodically wake up the interface 114 to check for device removal states. The device connection manager 132 may read the register 204-1 to determine whether the device 116 is in a lower power management state. If so, the device connection manager 132 sends notification to the interface 114 to wake up as indicated by arrow 708. The interface 114 sends a COMWAKE-HOST to the device 116 as indicated by arrow 710. The device 116 sends a COMWAKE-TARGET to the interface 114 as indicated by arrow 712. At some point, a device disconnect state is detected using, for example, the detection control logic 300 and the pulse transmission and sensing circuit 302 as indicated by arrow 714. The host controller 112 stores this information in the register 204-2. The interface 114 reads the register 204-2, determines the device 116 has been removed, generates an interrupt 212, and sends the interrupt 212 to the device connection manager 132 as indicated by arrow 716.

Meanwhile the device connection manager 132 has been monitoring the delay timer 202 for expiration. If the device connection manager 132 does not receive an interrupt 212 before expiration of the delay timer 202 (e.g., 10 ms), the device connection manager 132 resets the delay timer 202 and waits to send another control directive at the scheduled time 1 sec later. If the device connection manager 132 does receive an interrupt 212 from the interface 114 before expiration of the delay timer 202 (e.g., 10 ms) as indicated by arrow 716, however, the device connection manager 132 sends a query to a port x of the interface 114 as indicated by the arrow 718. The interface 114 sends a COMRESET/COMINIT to the device 116 as indicated by the arrow 720. The interface 114 recognizes a COMRESET/COMINIT OOB time out, and sends a notification to the device connection manager 132 that the device 116 has been removed as indicated by the arrow 722. The device connection manager 132 enumerates or re-enumerates all ports for the interface 114 to determine a topology subsequent to the removal of the device 116, as indicated by arrows 724, 726 and 728, which correspond to similar messages and/or operations described for respective arrows 628, 630 and 632 described with reference to the message flow 600. The device connection manager 132 then notifies the OS 120 of the removed device 116.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a memory unit to store a device connection manager for a controller of a bi-directional serial link connected to a device;
detection control logic to connect to the bi-directional serial link, the detection control logic operative to determine whether the device is disconnected from the bi-directional serial link, and store information indicating a device disconnect state in a first register of the controller; and
a processor operative to execute the device connection manager, the device connection manager operative to read a second register of the controller storing information indicating an interface of the controller for the bi-directional serial link is operating in a lower power management state, send a control directive on a periodic basis for the interface to transition to a temporary active state, and receive an interrupt from the interface indicating the device is disconnected from the bi-directional serial link during a given temporary active state, the given temporary active state having a time interval long enough to allow out of band (OOB) signaling to finish before returning the interface to the lower power management state.

2. The apparatus of claim 1, the bi-directional serial link comprising a serial advanced technology attachment (SATA) bi-directional serial link.

3. The apparatus of claim 1, the bi-directional serial link comprising a SATA system-to-system interconnect (eSATA) for external storage applications.

4. The apparatus of claim 1, the controller comprising a SATA controller and the interface comprising a SATA advanced host controller interface (AHCI) for the bi-directional serial link connected to the device.

5. The apparatus of claim 1, the lower power management state comprising a SATA partial power management state or a SATA slumber power management state.

6. The apparatus of claim 1, comprising a delay timer for the device connection manager, the device connection manager operative to send a control directive on a periodic basis to the interface to transition to the temporary active state for a defined time interval as measured by the delay timer.

7. The apparatus of claim 1, the device connection manager operative to receive an interrupt from the interface indicating when the device is disconnected from the bi-directional serial link during the given temporary active state of the interface, wherein the interrupt is generated based on information indicating the device is disconnected stored in a register of the controller.

8. The apparatus of claim 1, comprising a delay timer for the device connection manager, the device connection manager operative to send a control directive to the interface to resume the lower power management state when the delay timer expires, and reset the delay timer to a defined time interval.

9. The apparatus of claim 1, comprising the information indicating the device disconnect state stored in the first register of the controller to cause the interrupt to be sent from the interface and received by the device connection manager during the given temporary active state.

10. The apparatus of claim 1, comprising a pulse transmission and sensing circuit to connect to the detection control logic, the pulse transmission and sensing circuit operative to send a step pulse across the bi-directional serial link and determine a length of time the bi-directional serial link takes to charge from common mode voltage to supply voltage.

11. The apparatus of claim 10, the detection control logic to determine whether the device is disconnected from the bi-directional serial link based on a length of a bi-directional serial link charge time.

12. The apparatus of claim 1, comprising a display to connect to the processor operative to execute the device connection manager.

13. A method, comprising:
reading a first register of a host bus adapter storing information indicating an interface of the host bus adapter for a bi-directional serial link connected to a device is operating in a lower power management state;
sending a control directive on a periodic basis to instruct the interface to transition to a temporary active state, the temporary active state having a time interval long enough to allow out of band (OOB) signaling to finish before returning the interface to the lower power management state;
receiving an interrupt from the interface indicating the device is disconnected from the bi-directional serial link during a given temporary active state; and
enumerating all devices controlled by the host bus adapter based on the interrupt.

14. The method of claim 13, comprising sending a control directive to the interface on a periodic basis to instruct the interface to transition to the temporary active state for a defined time interval as measured by a delay timer.

15. The method of claim 13, comprising receiving an interrupt from the interface indicating when the device is disconnected from the bi-directional serial link during the given temporary active state of the interface, wherein the interrupt is generated based on information indicating the device is disconnected stored in a second register of the host bus adapter.

16. The method of claim 13, comprising sending a control directive to the interface to resume the lower power management state when a delay timer expires, and resetting the delay timer to a defined time interval.

17. An article comprising a non-transitory computer-readable storage medium containing instructions that when executed by a processor enable a system to:
read a first register of a controller storing information indicating an interface of the controller for a bi-directional serial link connected to a device is operating in a lower power management state;
send a control directive on a periodic basis to instruct the interface to transition to a temporary active state, the temporary active state having a time interval long enough to allow out of band (OOB) signaling to finish before returning the interface to the lower power management state; and
receive an interrupt from the interface indicating when the device is disconnected from the bi-directional serial link during a given temporary active state.

18. The article of claim 17, comprising instructions that when executed by a processor enable the system to send a control directive to the interface on a periodic basis to instruct the interface to transition to the temporary active state for a defined time interval as measured by a delay timer.

19. The article of claim 17, comprising instructions that when executed by a processor enable the system to receive an interrupt from the interface indicating when the device is disconnected from the bi-directional serial link during the temporary active state of the interface, wherein the interrupt is generated based on information indicating the device is disconnected stored in a second register of the controller.

20. The article of claim 17, comprising instructions that when executed by a processor enable the system to send a control directive to the interface to resume the lower power management state when a delay timer expires, and reset the delay timer to a defined time interval.

* * * * *

UNITED STATES PATENT AND TRADEMARK OFFICE
CERTIFICATE OF CORRECTION

| | | |
|---|---|---|
| PATENT NO. | : 8,615,671 B2 | Page 1 of 1 |
| APPLICATION NO. | : 12/576999 | |
| DATED | : December 24, 2013 | |
| INVENTOR(S) | : Raymond C. Robles | |

It is certified that error appears in the above-identified patent and that said Letters Patent is hereby corrected as shown below:

In the Drawings:

On sheet 4 of 7, FIG. 4, reference numeral 402, line 3, delete "TIIE" and insert -- THE --, therefor.

Signed and Sealed this
Fourteenth Day of October, 2014

Michelle K. Lee
*Deputy Director of the United States Patent and Trademark Office*